United States Patent
Brunton et al.

(10) Patent No.: US 8,497,457 B2
(45) Date of Patent: Jul. 30, 2013

(54) FLIGHT VEHICLES WITH IMPROVED POINTING DEVICES FOR OPTICAL SYSTEMS

(75) Inventors: Daniel W. Brunton, Tucson, AZ (US);
Michael P. Schaub, Tucson, AZ (US);
Brian S. Scott, Vail, AZ (US)

(73) Assignee: Raytheon Company, Waltham, MA (US)

( * ) Notice: Subject to any disclaimer, the term of this patent is extended or adjusted under 35 U.S.C. 154(b) by 316 days.

(21) Appl. No.: 12/961,754

(22) Filed: Dec. 7, 2010

(65) Prior Publication Data

US 2012/0138728 A1  Jun. 7, 2012

(51) Int. Cl.
F41G 7/22 (2006.01)
F42B 15/01 (2006.01)
F41G 7/00 (2006.01)
F42B 15/00 (2006.01)

(52) U.S. Cl.
USPC .......... 244/3.16; 244/3.1; 244/3.15; 244/3.17

(58) Field of Classification Search
USPC .............. 244/3.1–3.19; 359/831–837, 196.1, 359/197.1, 209.1, 211.1–211.3, 362, 399–406, 359/642, 708, 726–728; 250/200, 201.1, 250/201.9, 203.1–203.3, 239, 336.1, 338.1, 250/340, 342
See application file for complete search history.

(56) References Cited

U.S. PATENT DOCUMENTS

| | | | | |
|---|---|---|---|---|
| 3,000,307 A | * | 9/1961 | Trotter, Jr. | 244/3.16 |
| 3,001,186 A | * | 9/1961 | Baltzer | 244/3.15 |
| 3,165,749 A | * | 1/1965 | Cushner | 244/3.19 |
| 3,617,016 A | * | 11/1971 | Bolsey | 244/3.16 |
| 3,762,666 A | * | 10/1973 | Thompson | 244/3.19 |
| 3,954,228 A | * | 5/1976 | Davis, Jr. | 244/3.16 |
| 3,971,939 A | * | 7/1976 | Andressen | 244/3.16 |
| 3,974,383 A | * | 8/1976 | Chapman | 244/3.11 |
| 3,979,086 A | * | 9/1976 | MacAdam | 244/3.19 |
| 3,982,714 A | * | 9/1976 | Kuhn | 244/3.16 |
| 3,986,682 A | * | 10/1976 | Dryden | 244/3.17 |
| 3,995,792 A | * | 12/1976 | Otto et al. | 244/3.14 |
| 4,024,392 A | * | 5/1977 | Teppo et al. | 244/3.16 |
| 4,193,688 A | * | 3/1980 | Watkins | 244/3.16 |
| 4,252,401 A | * | 2/1981 | Jozwiak | 359/211.1 |
| 4,422,601 A | * | 12/1983 | Chavany et al. | 244/3.13 |
| 4,436,260 A | * | 3/1984 | Donelan | 244/3.16 |
| 4,442,431 A | * | 4/1984 | Bleakney | 244/3.14 |
| 4,457,475 A | * | 7/1984 | Ahlstrom | 244/3.15 |
| 4,787,725 A | * | 11/1988 | Preussner et al. | 359/401 |
| 5,061,930 A | * | 10/1991 | Nathanson et al. | 244/3.19 |
| 5,088,659 A | * | 2/1992 | Neff et al. | 244/3.16 |
| 5,512,741 A | * | 4/1996 | Levaillant et al. | 359/401 |
| 6,310,730 B1 | * | 10/2001 | Knapp et al. | 244/3.17 |
| 6,313,951 B1 | * | 11/2001 | Manhart et al. | 244/3.17 |
| 6,343,767 B1 | | 2/2002 | Sparrold et al. | |
| 6,356,396 B1 | * | 3/2002 | Chen et al. | 244/3.17 |
| 6,371,405 B1 | * | 4/2002 | Sallee et al. | 244/3.16 |
| 6,411,445 B1 | * | 6/2002 | Jackson | 359/726 |
| 6,462,889 B1 | * | 10/2002 | Jackson | 244/3.17 |

(Continued)

*Primary Examiner* — Bernarr Gregory
(74) *Attorney, Agent, or Firm* — Eric A. Gifford

(57) ABSTRACT

A pointing device is provided for directing electromagnetic radiation along a line of sight within a flight vehicle. The pointing device includes a beam deviation structure; a rotation assembly configured to support the beam deviation structure such that the beam deviation structure is pivotable about the rotation axis; and a nod gimbal configured to support the rotation assembly and the beam deviation structure such that the rotation assembly and the beam deviation structure are pivotable about a nod axis.

20 Claims, 4 Drawing Sheets

U.S. PATENT DOCUMENTS

| | | | |
|---|---|---|---|
| 6,552,318 B1 * | 4/2003 | Crowther et al. | 250/201.9 |
| 7,042,654 B2 * | 5/2006 | Knapp | 359/708 |
| 7,304,296 B2 * | 12/2007 | Mills et al. | 244/3.16 |
| 7,378,626 B2 * | 5/2008 | Fetterly | 244/3.1 |
| 7,667,190 B2 * | 2/2010 | Mills et al. | 250/239 |
| 7,701,653 B2 * | 4/2010 | Baumann | 359/834 |
| 7,813,644 B2 * | 10/2010 | Chen et al. | 244/3.17 |
| 7,898,712 B2 * | 3/2011 | Adams et al. | 359/211.2 |

* cited by examiner

FLIGHT VEHICLES WITH IMPROVED POINTING DEVICES FOR OPTICAL SYSTEMS

TECHNICAL FIELD

The following disclosure relates generally to optical systems in flight vehicles and, more particularly, to pointing devices for optical systems in flight vehicles.

BACKGROUND

Optical systems used in flight vehicles, including aircraft and missile applications, typically include sensors to receive radiated energy from a scene and convert it to an electrical signal. The electrical signal is provided to a display or further processed for pattern recognition, guidance, or the like. For example, the optical system may form part of a seeker (or homing guidance system) containing one or more electromagnetic (EM) radiation sensors, which detect electromagnetic radiation emitted by or reflected from a designated target. Such seekers typically include the optical system mounted behind a transparent seeker dome at the nose of the seeker. The dome protects the optical system components while enabling transmission of electromagnetic waves within the sensor bandwidths through the dome and to the EM radiation sensors.

The optical system components generally have only a limited field of view for receiving the radiated energy. However, the optical system may be manipulated by a pointing device to provide a field of regard larger than the field of view such that the radiated energy through the dome may be directed to the EM radiation sensors. Conventional pointing devices may include various gimbals and other structures to direct the line of sight. However, conventional pointing devices are subject to issues with size, weight, degrees of freedom, field of regard, and cost.

Thus, there is a need for improved pointing devices for optical systems in flight vehicles. Other desirable features and characteristics of the present invention will become apparent from the subsequent Detailed Description and the appended Claims, taken in conjunction with the accompanying Drawings and this Background.

BRIEF SUMMARY

In accordance with an exemplary embodiment, a pointing device is provided for directing electromagnetic radiation along a line of sight within a flight vehicle. The pointing device includes a beam deviation structure; a rotation assembly configured to support the beam deviation structure such that the beam deviation structure is pivotable about the rotation axis; and a nod gimbal configured to support the rotation assembly and the beam deviation structure such that the rotation assembly and the beam deviation structure are pivotable about a nod axis.

In accordance with another exemplary embodiment, a flight vehicle includes a fuselage; a seeker coupled to the forward end of the fuselage, the seeker including a seeker body, a window coupled to the seeker body, an optical system disposed within the seeker body; and a pointing device configured to position the optical system within the seeker body to receive electromagnetic (EM) radiation through the window. The pointing device includes a beam deviation structure, a rotation assembly configured to support the beam deviation structure such that the beam deviation structure is pivotable about a rotation axis, and a nod gimbal configured to support the rotation assembly and the beam deviation structure such that the rotation assembly and the beam deviation structure is pivotable about a nod axis.

In accordance with yet another exemplary embodiment, a method is provided for positioning an optical system in a flight system. The method includes pivoting a wedge prism about a nod axis to a pitch angle ($\rho$), the wedge prism having a wedge deviation angle ($\alpha$); and pivoting the wedge prism, at the pitch angle ($\rho$), about a wedge axis to a rotation angle ($\psi$).

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following description.

Broadly, exemplary embodiments discussed herein relate to flight vehicles, such as a guided munition, with a seeker or other sensor system having improved pointing devices for optical systems disposed therein. The optical systems typically include one or more electromagnetic (EM) radiation sensors that receive light or other EM radiation guided through optical elements positioned within or adjacent to a seeker dome or window by the pointing device. Particularly, exemplary pointing devices include a beam deviation structure, such as a wedge prism, supported on a rotation assembly that enables rotation of the beam deviation structure with respect to the other optical components of the system about a rotation axis. The rotation assembly is mounted on a nod gimbal such that the rotation assembly and selected other optical components additionally may be pivoted about a nod axis. This allows the line of sight to be moved in two directions (i.e. up and down and left and right) with respect to the vehicle. Motors are provided to position the optical device line of sight via the rotation assembly and the nod gimbal at desirable angles to appropriately guide the EM radiation to the EM radiation sensors.

Figure 1:
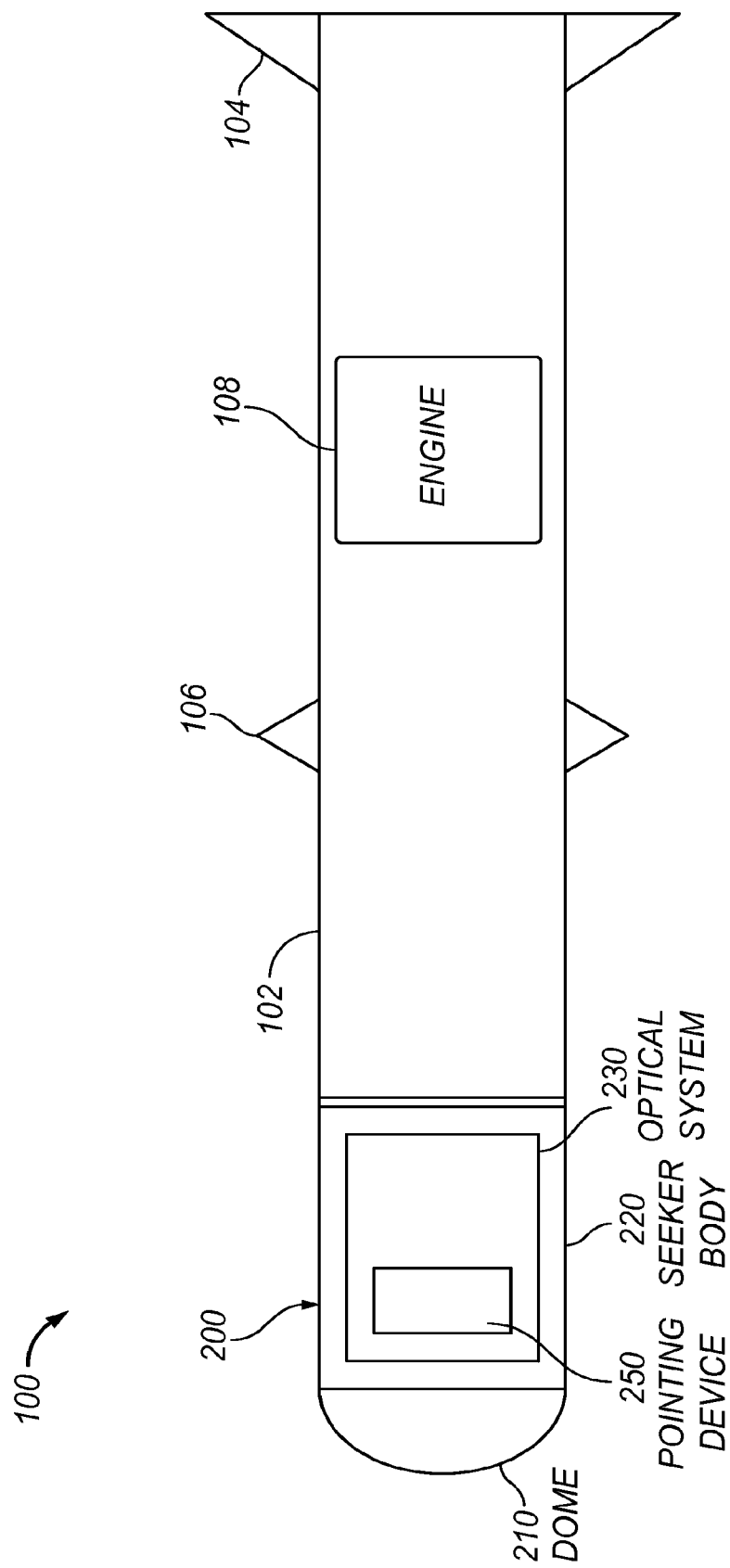
FIG. 1 is a schematic view of a flight vehicle in accordance with an exemplary embodiment.

FIG. 1 is a schematic representation of a flight vehicle 100 in accordance with an exemplary embodiment. The flight vehicle 100 may be, for example, a guided munition or unmanned missile and includes a fuselage 102, tail fins 104, and guide fins 106. The flight vehicle 100 may be unpowered or is powered by an engine 108, such as a gas turbine engine, a rocket engine, or an engine driving a propeller. The flight vehicle 100 may further include a seeker 200 positioned at the forward end of the flight vehicle 100 that includes a transparent dome 210 and a seeker body 220. As described below and schematically shown in FIG. 1, the seeker 200 further includes an optical system 230 positioned by a pointing device 250 to receive electromagnetic (EM) radiation through the dome 210.

Figure 2:
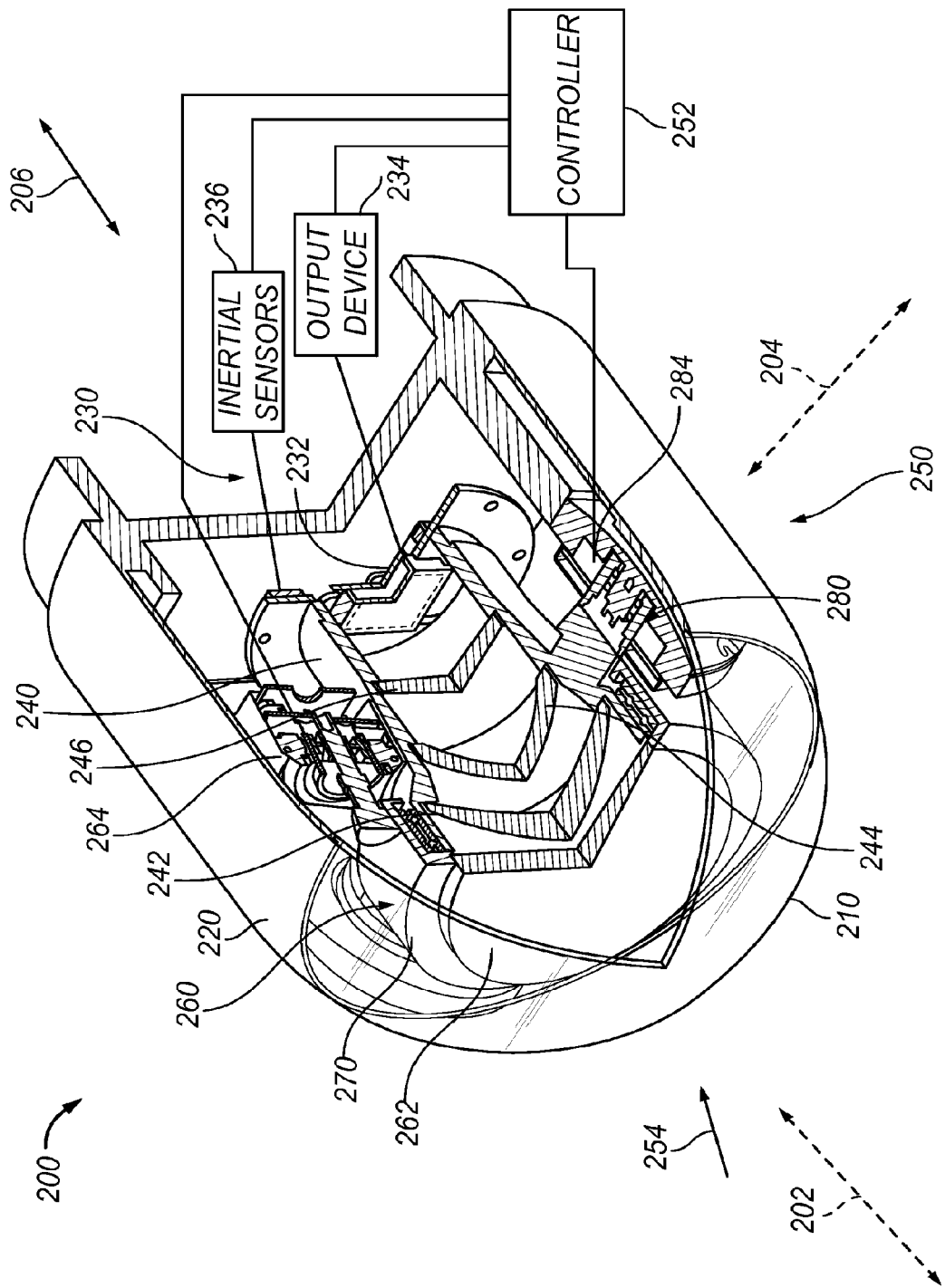
FIG. 2 is a more detailed, sectional cut-away isometric view of a seeker incorporated into the flight vehicle of FIG. 1 in accordance with an exemplary embodiment.
Figure 3:
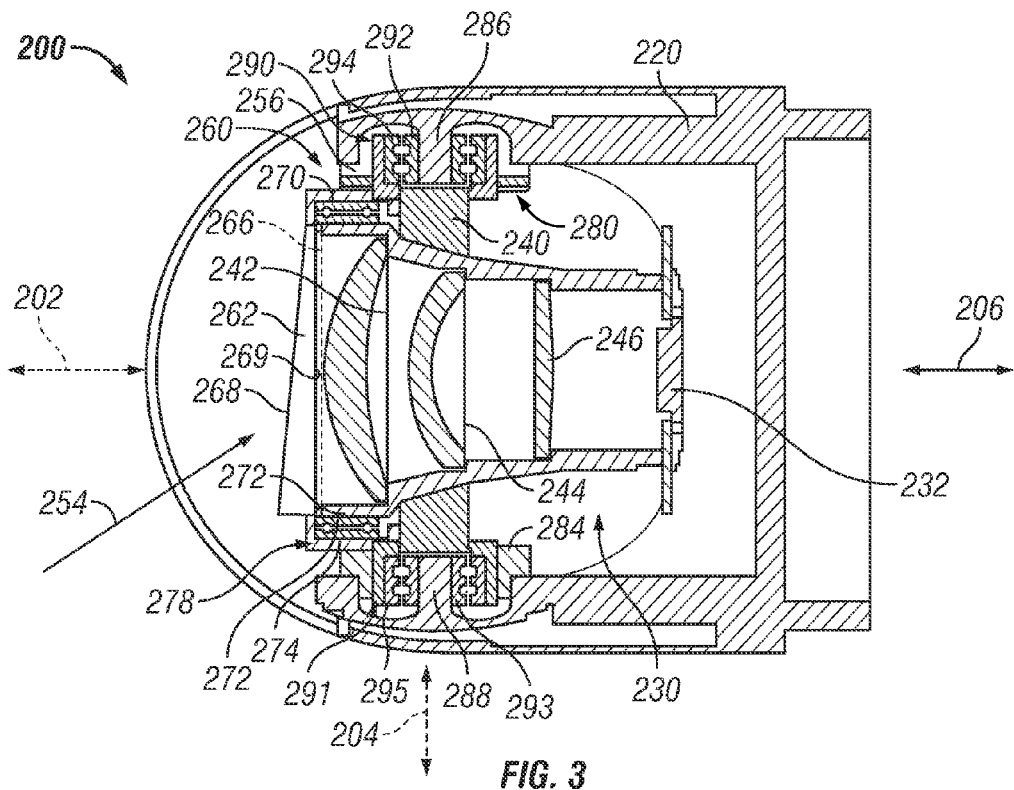
FIG. 3 is a first cross-sectional side view of a pointing device incorporated into the seeker of FIG. 2 in accordance with an exemplary embodiment.
Figure 4:
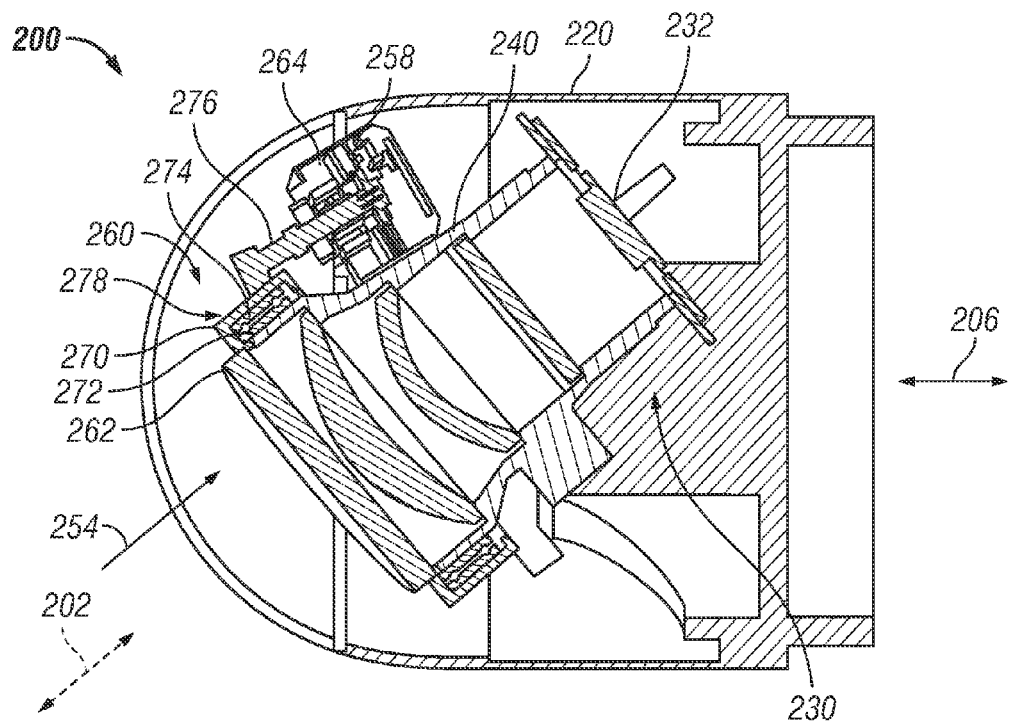
FIG. 4 is a second cross-sectional side view of the pointing device incorporated into the seeker of FIG. 2 in accordance with an exemplary embodiment.

FIG. 2 is a more detailed, sectional cut-away isometric view of the seeker 200. FIG. 3 is a first side cross-sectional view of the seeker 200, and FIG. 4 is a second side cross-sectional view of the seeker 200. Particularly, the view of FIG. 4 is orthogonal to that of FIG. 3, i.e., rotated 90° about the longitudinal axis 206 of the seeker 200 with the nod axis rotated 45°. FIGS. 2-4 will be collectively discussed below.

As previously indicated, the optical system 230 is enclosed within the seeker 200 by the dome 210 and the seeker body 220. The dome 210 is transmissive to one or more bandwidths of EM radiation emitted by or reflected from a designated target and detectable by EM radiation sensors 232. The dome 210 will typically be transmissive to one or more of the visible, near infrared, mid-wavelength infrared, long wavelength infrared, and/or millimeter wavelength radio frequency bandwidths. The dome 210 can be formed from any suitable material that allows the transmission of EM radiation or signals through dome 210 within the desired sensor bandwidths and that possesses sufficient structural strength to remain intact during munition handling, launch, and flight. By way of non-limiting example, dome 210 may be formed from diamond, sapphire, zinc sulfide (ZnS), yttrium oxide ($Y_2O_3$), aluminum oxynitride (AlON), Spinel ($MgAl_2O_4$), magnesium fluoride ($MgF_2$), composite optical ceramics, glasses, and similar materials. Although by no means limited to a particular geometry, the dome 210 will typically be either a spherical segment or ogival in shape.

Generally, the optical system 230 of the seeker 200 includes one or more EM radiation sensors 232 configured to receive EM radiation through the dome 210 from a designated target to provide pattern recognition, passive guidance, semi-active guidance, or active guidance in the conventionally-known manner EM radiation sensors 232 may include any number of EM radiation detection devices suitable for performing this purpose and for detecting radiation within any given frequency band of the EM spectrum including, but not limited to, one or more of the ultraviolet, visible, infrared (e.g., near-infrared, mid-infrared, and far-infrared), microwave, and radio wave frequencies. As shown in FIG. 2, the EM radiation sensors 232 may be coupled to an output device 234 that appropriately processes the EM radiation detected by the EM radiation sensors 232 for the purposes described above. During seeker operation or imaging, EM radiation sensors 232 detect electromagnetic radiation emitted by or reflected from a designated target or targets and transmitted through dome 210. Although the embodiments discussed herein refer to EM radiation sensors 232, such as an optical light receiver, the pointing device 250 may also function to manipulate an EM radiation source, such as a laser or LED light source, or, more generally, a transceiver that receives and transmits EM radiation.

Although not shown for clarity, seeker 200 will include a number of other conventionally-known components suitable for providing the desired functionalities. Such components may include, but are not limited to, guidance control electronics (e.g., a control card stack), antennae, internal navigational systems (e.g., global positioning systems and/or inertial navigational systems), power supplies (e.g., battery packs), and the like. The optical system 230 may also include a data link (e.g., a networked radio antenna) to enable the transmission of in-flight targeting updates and imaging data.

When stationary, the optical system 230 may be limited to receiving EM radiation from a field of view centered along a line of sight 254. As such, the pointing device 250 is provided to articulate the line of sight 254 within a field of regard (FOR) such that the optical system 230 is better positioned to receive EM radiation from desired targets. Generally, the pointing device 250 is manipulated with a controller 252 that may receive inputs from a user and/or an automated guidance or detection system (not shown). The controller 252 may be a microprocessor, ASIC, or other suitable device to drive the pointing device 250 and thereby to steer the line of sight 254 to the desired angles. As shown schematically in FIG. 2, the controller 252 may use signals from one or more inertial sensors 236 to evaluate and position the pointing device 250.

The pointing device 250 includes a frame 240 on which is mounted a rotation assembly 260 supporting a beam deviation structure. In the illustrated exemplary embodiment, the beam deviation structure includes a wedge prism 262 in a wedge prism support 270, and as such, the rotation assembly 260 is referenced as the wedge rotation assembly 260. The frame 240 further supports a nod gimbal 280. The wedge rotation assembly 260 enables the wedge prism 262 to be rotated about a wedge rotation axis 202 by a first motor 264, and the nod gimbal 280 enables movement of the frame 240 (and consequently the wedge prism 262) about a nod axis 204 by a second motor 284. The wedge rotation axis 202 is most clearly shown in FIG. 4, and the nod axis 204 is most clearly shown in FIG. 3. The first and second motors 264, 284 may independently pivot the wedge rotation assembly 260 and nod gimbal 280, respectively. As noted above, the first and second motors 264, and 284 are controlled by the controller 252. As discussed more fully below, the pointing device 250 enables the seeker 200 to point or manipulate the line of sight 254 within a predetermined field of regard (FOR).

During operation, EM radiation along the line of sight 254 passes through the dome 210, through the wedge prism 262, and to one or more lenses 242, 244, and 246 supported in the frame 240. Although three lenses 242, 244, and 246 are shown, any number of lenses, mirrors, or other telescope components may be used to collectively gather and focus the EM radiation to the EM radiation sensors 232.

As noted above and as particularly shown in FIG. 3, the first component of the pointing device 250 is the nod gimbal 280 manipulated along the nod axis 204 with the second motor 284. The nod gimbal 280 includes pins 286 and 288 extending from the seeker body 220 along the nod axis 204. The nod gimbal 280 further includes nod gimbal bearing assemblies 290 and 291 that movably couple the pins 286 and 288 to the frame 240. For example, the nod gimbal bearing assemblies 290 and 291 include inner raceways 292 and 293 fixedly coupled to the pin 286 or 288 and outer raceways 294 and 295 fixedly coupled to the frame 240 with bearing elements disposed in between to enable relative movement of the inner raceways 292 and 293 and the outer raceways 294 and 295, and thus the frame 240, relative to the seeker body 220. The nod gimbal 280 provides the optical system 230 the first degree of freedom relative to the other components of the seeker 200. As noted above, the second motor 284, and thus the movement of the nod gimbal 280, may be controlled in accordance with signals from the controller 252. The extent of pivoting about the nod axis 204 relative to the longitudinal axis 206 of the seeker 200 may be referred to as the pitch angle ($\rho$), as discussed in greater detail below. In general, the pitch angle ($\rho$) may be measured by a sensor 256 or derived from control signals and/or other indirect sensor measurements, such as from the inertial sensors 236. The sensor 256 may include, as examples, optical decoders, variable resistors, resolvers, and/or differential transformers.

As noted above, the wedge rotation assembly 260 includes the wedge prism 262 mounted within the wedge prism support 270, which in turn, is mounted on the frame 240 and thus may be positioned by the nod gimbal 280. Additionally, the wedge rotation assembly 260 enables rotation of the wedge prism 262 about the wedge rotation axis 202 at any pitch angle ($\rho$). The extent of pivoting about the wedge rotation axis 202 may be referred to as a rotation angle ($\psi$) and is discussed in greater detail below. As best shown in FIG. 3, the wedge prism 262 has a trapezoidal geometry with a front surface 268 and a back surface 269. Generally, the front surface 268 is angled relative to the back surface 269 at a wedge angle, as also referenced below. As also schematically shown in FIG. 3, the wedge prism 262 may include a dome correction layer 266. The dome correction layer 266 may correct any aberration in the EM radiation resulting from the dome 210. In the embodiment of FIG. 3, the dome correction layer 266 may be incorporated into the wedge prism 262, although in other embodiments, the correction layer 266 may be a separate lens. In further embodiments, the correction layer 266 may be omitted. As shown, only a single wedge prism 262 is provided, although other embodiments may include additional wedge prisms. Generally, the wedge prism 262 is configured as an achromatic and/or single spectral band wedge that admits the desired wavelengths, including visible, short-wavelength infrared (SWIR), mid-wavelength infrared (MWIR), or long-wavelength infrared (LWIR), although other configurations are possible. Exemplary materials of the wedge prism 262 may include plastic, glass, zinc sulfide, calcium fluoride, and germanium, depending on the desired optical properties.

As best shown in FIG. 4, the wedge rotation assembly 260 includes a wedge prism bearing apparatus 278. For example, the wedge prism bearing apparatus 278 includes an inner raceway 272 fixedly coupled to the frame 240 and an outer raceway 274 fixedly coupled to the wedge prism support 270. Roller elements (not shown) are positioned between the inner raceway 272 and outer raceway 274 to enable rotational movement between the frame 240 and the wedge prism support 270. The wedge prism support 270 is driven by the first motor 264 that engages the outer raceway 274 through a drive link 276 in accordance with signals from the controller 252 to establish the magnitude of the degree of rotation about the wedge rotation axis 202. The first motor 264 and/or drive link 276 may be geared or direct (not shown). As discussed below, the degree of rotation may be referred to as the rotation angle ($\psi$). In general, the rotation angle ($\psi$) may be measured by a sensor 258 or derived from control signals and/or other indirect sensor measurements. The sensor 258 may include, as examples, optical decoders, variable resistors, resolvers, and/or differential transformers.

As noted above, the beam deviation structure includes the wedge prism 262. However, in other exemplary embodiments, the wedge prism 262 may be replaced or complemented by other optical components, including diffraction grating, other wedges, off-axis lenses or lens segments, and mirrors, that may be mounted on the rotation assembly 260, which in turn is mounted on the nod gimbal 280. Additional wedge prisms for chromatic aberration control and/or to increase the effective prism deviation angle may also be provided.

As such, the wedge rotation assembly 260 and nod gimbal 280 are cooperatively positioned to provide the desired line of sight, as will now be discussed. Generally, the reference angles associated with the seeker 200 may be defined in a seeker reference frame with a look angle, an azimuth angle, and an elevation angle, as is familiar in the art. The transformation from the reference frame of the seeker ($A_0$, $B_0$, $C_0$) to the line of sight reference frame ($A_3$, $B_3$, $C_3$) includes a first transformation according to the pitch angle ($\rho$) or the extent the nod gimbal 280 pivots the wedge rotation assembly 260 about the nod axis 204; a second transformation according to a rotation angle ($\psi$) or the extent the wedge rotation assembly 260 pivots the wedge prism 262; and a third transformation according to the wedge deviation angle ($\alpha$) or the fixed optical angle of the wedge prism 262 resulting from the wedge angle and the materials of the wedge prism 262 in accordance with Snell's law. The three transformations may be respectively represented by the Systems of Equations (1)-(3):

$$\begin{bmatrix} A_1 \\ B_1 \\ C_1 \end{bmatrix} = \begin{bmatrix} \cos(\rho) & 0 & -\sin(\rho) \\ 0 & 1 & 0 \\ \sin(\rho) & 0 & \cos(\rho) \end{bmatrix} \begin{bmatrix} A_0 \\ B_0 \\ C_0 \end{bmatrix} \quad (1)$$

$$\begin{bmatrix} A_2 \\ B_2 \\ C_2 \end{bmatrix} = \begin{bmatrix} 1 & 0 & 0 \\ 0 & \cos(\psi) & \sin(\psi) \\ 0 & -\sin(\psi) & \cos(\psi) \end{bmatrix} \begin{bmatrix} A_1 \\ B_1 \\ C_1 \end{bmatrix} \quad (2)$$

$$\begin{bmatrix} A_3 \\ B_3 \\ C_3 \end{bmatrix} = \begin{bmatrix} \cos(\alpha) & 0 & \sin(\alpha) \\ 0 & 1 & 0 \\ -\sin(\alpha) & 0 & \cos(\alpha) \end{bmatrix} \begin{bmatrix} A_2 \\ B_2 \\ C_2 \end{bmatrix} \quad (3)$$

As such, the reference angles of FOR, azimuth, and elevation may be defined in accordance with the nod angle, rotation angle, and wedge deviation angle, as listed below in Equations (4)-(6):

$$\cos(\text{FOR})(A_3 = f(A_0)) : \cos(\alpha)\cos(\rho) + \sin(\alpha)\cos(\psi)\sin(\rho) \quad (4)$$

$$\sin(\text{azimuth angle})(A_3 = f(B_0)) : -\sin(\alpha)\sin(\psi) \quad (5)$$

$$\sin(\text{elevation angle})(A_3 = f(C_0)) : \sin(\alpha)\cos(\psi)\cos(\rho) - \cos(\alpha)\sin(\rho) \quad (6)$$

It should be noted that the embodiments discussed above include a pointing device 250 with the nod axis in elevation orientation. However, the pointing device 250 may also be reoriented such that the nod axis is oriented in the azimuth, depending on whether a larger angle is desired in elevation or azimuth. Unlike some conventional transformations, the transformations associated with pointing device 250 do not result in any singularities nor require large mechanical translations for small adjustments if the wedge deviation angle is larger than the desired field of regard (FOR) orthogonal to the pitch axis. In one exemplary embodiment, a wedge deviation angle ($\alpha$) of, for example, 15.4°, was created using a Germanium wedge with an angle of 5° may have a field of regard (FOR) of +/−14° with a travel of the wedge axis of +/−65°. The wedge deviation angle ($\alpha$) may have a range of at least approximately 30°. Accordingly, the motors 264 and 284 respectively drive the wedge rotation assembly 260 and the nod gimbal 280 to position the pointing device 250, and thus the line of sight 254, to the desired azimuth and elevation angles by command of the pitch angle ($\rho$) and rotation angle ($\psi$). Accordingly, exemplary embodiments provide a pointing device 250 with a relatively large field of regard (FOR) in a first direction (i.e., about the nod axis 204) and relatively moderate FOR in an orthogonal direction (i.e., as the wedge prism 262 sweeps about the roll axis 202). The resulting optical system requires less packaging volume relative to conventional optical systems. Although not shown, a one-axis Coude optical system may be provided for off gimbal EM radiation sensors.

Figure 5:
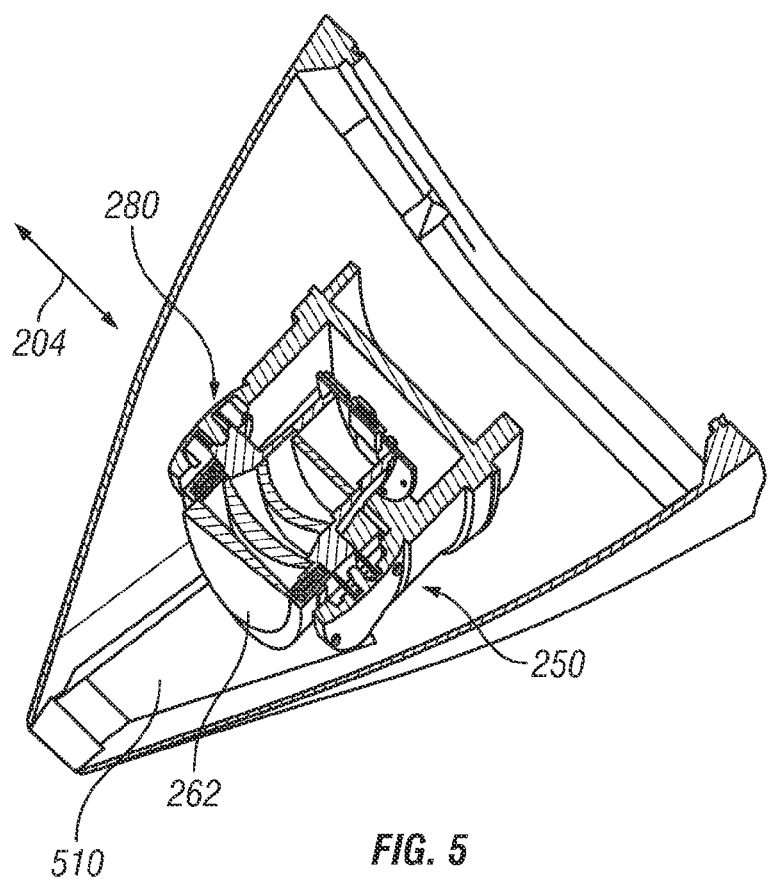
FIG. 5 is a cross-sectional isometric view of a pointing device incorporated into a seeker in accordance with an alternate exemplary embodiment.
Figure 6:
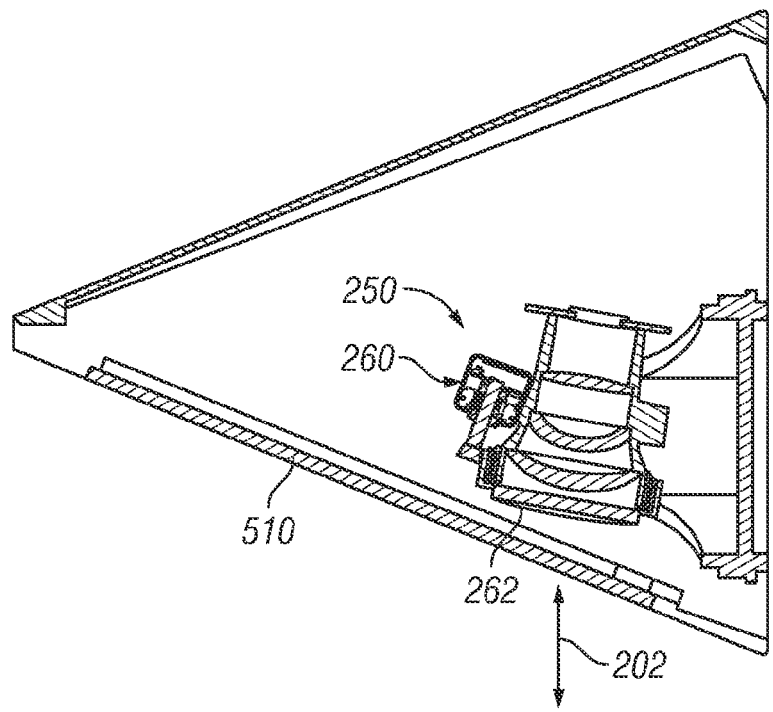
FIG. 6 is a cross-sectional side view of the pointing device incorporated into the seeker of FIG. 5.

FIGS. 5 and 6 are a cross-sectional isometric view and side view, respectively, of the pointing device 250 incorporated into a flight vehicle with a flat window 510. Generally, the pointing device 250 of FIGS. 5 and 6 is similar to that discussed above in reference to FIGS. 3-4. In particular, the pointing device 250 may include a wedge rotation assembly 260 that articulates a wedge prism 262 about a wedge rotation axis 202 and a nod gimbal 280 that articulates the pointing device 250 about a nod axis 204, as described above. In the exemplary embodiment of FIGS. 5 and 6, a correction layer (such as correction layer 266) is not required since the line of sight is not subject to a dome effect. As such, the various embodiments, the flat window seeker, such as that shown in FIGS. 5 and 6, or a dome seeker, such as that shown in FIGS. 1-4, may be selected based on aerodynamic and/or performance issues, and the pointing device 250 may be incorporated into either application.

Exemplary embodiments discussed herein provide a highly desirably collection of characteristics relative to conventional pointing devices. Exemplary pointing devices provide a power efficient, reliable, compact, lightweight and cost-effective solution for optical systems of flight vehicles. Exemplary embodiments may be incorporated into any type of flight vehicle, including any number of seeker forms such as tilted side window seekers with symmetric or non-symmetric look angles, mini reconnaissance UAVs, small cameras, flat window and domed missile applications, and very high speed missiles.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A pointing device for directing electromagnetic radiation along a line of sight within a flight vehicle, comprising:
   a beam deviation structure;
   a rotation assembly configured to support the beam deviation structure such that the beam deviation structure is pivotable about a rotation axis; and
   a nod gimbal configured to support the rotation assembly and the beam deviation structure such that the rotation assembly and the beam deviation structure are pivotable about a nod axis.

2. The pointing device of claim 1, wherein the beam deviation structure includes a wedge prism, the rotation assembly is a wedge rotation assembly, and the rotation axis is a wedge rotation axis.

3. The pointing device of claim 2, further comprising at least one lens for focusing the electromagnetic radiation passing through the wedge prism.

4. The pointing device of claim 2, wherein the wedge prism has a first surface and a second surface, the first surface extending at an angle resulting in a wedge deviation angle ($\alpha$).

5. The pointing device of claim 4, further comprising:
   a first motor configured to pivot the wedge rotation assembly about the wedge rotation axis to a rotation angle ($\psi$), and
   a second motor configured to pivot the nod gimbal about the nod axis to a pitch angle ($\rho$).

6. The pointing device of claim 5, further comprising a controller to respectively actuate the first and second motors.

7. The pointing device of claim 6, wherein the controller is configured to calculate a field of regard (FOR) from the equation $$\cos(\text{FOR}) = \cos(\alpha)\cos(\rho) + \sin(\alpha)\cos(\psi)\sin(\rho).$$

8. The pointing device of claim 6, wherein the controller is configured to calculate an azimuth angle from the equation $$\sin(\text{azimuth angle}) = -\sin(\alpha)\sin(\psi).$$

9. The pointing device of claim 6, wherein the controller is configured to calculate an elevation angle from the equation $$\sin(\text{elevation angle}) = \sin(\alpha)\cos(\psi)\cos(\rho) - \cos(\alpha)\sin(\rho).$$

10. The pointing device of claim 1, further comprising a correction layer configured to correct the electromagnetic radiation passing through the wedge prism.

11. The pointing device of claim 1, wherein the dome correction layer is coupled to the wedge prism.

12. A flight vehicle, comprising:
    a fuselage;
    a seeker coupled to the forward end of the fuselage, the seeker comprising
    a seeker body,
    a window coupled to the seeker body;
    an optical system disposed within the seeker body; and
    a pointing device configured to position the optical system within the seeker body to receive electromagnetic (EM) radiation through the window, wherein the pointing device includes
    a beam deviation structure,
    a rotation assembly configured to support the beam deviation structure such that the beam deviation structure is pivotable about a rotation axis, and
    a nod gimbal configured to support the rotation assembly and the beam deviation structure such that the rotation assembly and the prism is pivotable about a nod axis.

13. The flight vehicle of claim 12, wherein the beam deviation structure includes a wedge prism, the rotation assembly is a wedge rotation assembly, and the rotation axis is a wedge rotation axis.

14. The flight vehicle of claim 13, wherein the window is dome-shaped.

15. The flight vehicle of claim 14, further comprising a correction layer configured to correct the electromagnetic radiation passing through the wedge prism for optical aberration attributable at least in part to the window.

16. The flight vehicle of claim 13, wherein the window is flat.

17. A method of positioning an optical system in a flight system, said optical system comprising a rotation assembly for rotation about a nod axis and a roll axis, comprising the steps of:
    supporting a wedge prism on the rotation assembly;
    rotating the wedge prism about the nod axis to a pitch angle ($\rho$), the wedge prism having a wedge deviation angle ($\alpha$); and rotating the wedge prism, at the pitch angle (ρ), about the roll axis to a rotation angle (ψ) to position the optical system.

18. The method of claim 17, further comprising the step of calculating with a controller a field of regard (FOR) for the flight vehicle from the equation $$\cos(FOR)=\cos(\alpha)\cos(\rho)+\sin(\alpha)\cos(\psi)\sin(\rho).$$

19. The method of claim 17, further comprising the step of calculating with the controller an azimuth angle for the flight vehicle from the equation $$\sin(\text{azimuth angle})=-\sin(\alpha)\sin(\psi).$$

20. The method of claim 17, further comprising the step of calculating with the controller an elevation angle for the flight vehicle from the equation $$\sin(\text{azimuth angle})=\sin(\alpha)\cos(\psi)\cos(\rho)-\cos(\alpha)\sin(\rho).$$

* * * * *